United States Patent
Zhang et al.

(10) Patent No.: US 10,136,367 B2
(45) Date of Patent: Nov. 20, 2018

(54) METHOD AND DEVICE FOR DETERMINING TIMING ADVANCE GROUP OF SERVING CELL

(71) Applicant: Huawei Technologies Co., Ltd., Shenzhen, Guangdong (CN)

(72) Inventors: Hongping Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 491 days.

(21) Appl. No.: 14/307,187

(22) Filed: Jun. 17, 2014

(65) Prior Publication Data

US 2014/0308956 A1 Oct. 16, 2014

Related U.S. Application Data

(63) Continuation of application No. PCT/CN2012/086725, filed on Dec. 17, 2012.

(30) Foreign Application Priority Data

Dec. 19, 2011 (CN) .......................... 2011 1 0426399

(51) Int. Cl.
*H04W 36/02* (2009.01)
*H04W 36/00* (2009.01)
*H04W 56/00* (2009.01)

(52) U.S. Cl.
CPC ... *H04W 36/0072* (2013.01); *H04W 56/0045* (2013.01); *H04W 56/0055* (2013.01)

(58) Field of Classification Search
CPC ............. H04W 56/00; H04W 56/0005; H04W 74/0833; H04W 36/00; H04W 74/08;
(Continued)

(56) References Cited

U.S. PATENT DOCUMENTS 8,380,196 B2 * 2/2013 Racz ................. H04W 36/0072
455/436
9,374,203 B2 * 6/2016 Kim ........................ H04L 5/001
(Continued)

FOREIGN PATENT DOCUMENTS

| CN | 101400107 A | 4/2009 |
| CN | 101753202 A | 6/2010 |

(Continued)

*Primary Examiner* — Khawar Iqbal
(74) *Attorney, Agent, or Firm* — Leydig, Voit & Mayer, Ltd.

(57) ABSTRACT

The present invention provides a method for determining a timing advance group of a serving cell, including: determining, by a source base station of a user equipment, a target base station that the user equipment is to be handed over to; sending auxiliary information for determining a timing advance group of a target serving cell of the user equipment to the target base station; receiving the timing advance group of the target serving cell of the user equipment that is determined by the target base station according to the auxiliary information; and sending the timing advance group to the user equipment. Implementation of the method provided by the present invention can avoid timing advance grouping performed on a secondary carrier after handover, and reduce data transmission interruption or delay incurred by the handover, thereby improving quality of service of a communications service.

7 Claims, 3 Drawing Sheets

(58) Field of Classification Search
CPC . H04W 36/02; H04W 36/08; H04W 56/0045; H04W 36/0072
USPC .......................................................... 455/436
See application file for complete search history.

(56) References Cited

U.S. PATENT DOCUMENTS

| | | | | |
|---|---|---|---|---|
| 9,439,123 B2* | 9/2016 | Matsuo | ................ | H04J 11/0069 |
| 9,544,921 B2* | 1/2017 | Kato | ................ | H04W 36/0055 |
| 2007/0298802 A1* | 12/2007 | Kaminski | ................ | 455/436 |
| 2008/0182579 A1* | 7/2008 | Wang et al. | ................ | 455/436 |
| 2008/0268850 A1* | 10/2008 | Narasimha | ........ | H04W 36/0072 |
| | | | | 455/437 |
| 2008/0318572 A1* | 12/2008 | Falaki et al. | ................ | 455/436 |
| 2009/0220087 A1* | 9/2009 | Brusilovsky | .......... | H04L 63/062 |
| | | | | 380/272 |
| 2010/0142485 A1* | 6/2010 | Lee | ................ | H04W 36/02 |
| | | | | 370/331 |
| 2010/0227627 A1* | 9/2010 | Ishii et al. | ................ | 455/456.2 |
| 2010/0317345 A1* | 12/2010 | Futaki | ................ | H04W 36/0055 |
| | | | | 455/436 |
| 2011/0158116 A1* | 6/2011 | Tenny et al. | ................ | 370/252 |
| 2012/0093128 A1* | 4/2012 | Song | ................ | H04W 36/0077 |
| | | | | 370/331 |
| 2012/0196603 A1* | 8/2012 | Mochizuki | ............ | H04W 48/02 |
| | | | | 455/436 |
| 2012/0218987 A1 | 8/2012 | Zhao et al. | | |
| 2012/0218988 A1 | 8/2012 | Xu et al. | | |
| 2012/0282969 A1* | 11/2012 | Jiang et al. | ................ | 455/517 |
| 2012/0287865 A1* | 11/2012 | Wu | ................ | H04W 74/006 |
| | | | | 370/329 |
| 2012/0307821 A1* | 12/2012 | Kwon | ................ | H04L 5/001 |
| | | | | 370/350 |
| 2013/0034085 A1* | 2/2013 | Bostrom | ........... | H04W 56/0045 |
| | | | | 370/336 |
| 2014/0044108 A1* | 2/2014 | Earnshaw | ............. | G01S 5/0063 |
| | | | | 370/336 |
| 2016/0037409 A1* | 2/2016 | Jeong | ................ | H04L 5/001 |
| | | | | 370/331 |
| 2016/0302129 A1* | 10/2016 | Lohr | ................ | H04W 72/0446 |
| 2016/0309370 A1* | 10/2016 | Narasimha | ........ | H04W 36/0077 |

FOREIGN PATENT DOCUMENTS

| | | |
|---|---|---|
| CN | 101796857 A | 8/2010 |
| CN | 102014476 A | 4/2011 |
| CN | 102014477 A | 4/2011 |
| CN | 102123475 A | 7/2011 |
| CN | 102281626 A | 12/2011 |
| EP | 2536227 A2 | 12/2012 |
| KR | 20110093632 A | 8/2011 |
| WO | WO 2009110718 A2 | 9/2009 |
| WO | WO 2010117761 A1 | 10/2010 |
| WO | 2011099795 A2 | 8/2011 |
| WO | WO 2012169840 A2 | 12/2012 |

* cited by examiner

METHOD AND DEVICE FOR DETERMINING TIMING ADVANCE GROUP OF SERVING CELL

CROSS-REFERENCE TO RELATED APPLICATIONS

This application is a continuation of International Patent Application No. PCT/CN2012/086725, filed on Dec. 17, 2012, which claims priority to Chinese Application No. 201110426399.6, filed on Dec. 19, 2011, both of which are herein by reference in their entireties.

TECHNICAL FIELD

The present invention relates to the field of communications, and in particular, to a method and device for determining a timing advance group of a serving cell.

BACKGROUND

As a mobile communications system develops, quality of service that can be provided by the system improves constantly. In order to further improve frequency domain efficiency and user throughput of the communications system, a carrier aggregation (Carrier Aggregation, Calif.) technology is introduced to LTE-A (Long Term Evolution-Advanced, long term evolution—advanced). In the carrier aggregation technology, a user equipment (User Equipment, UE) may use multiple serving cells simultaneously to perform uplink and downlink communication, so as to support high-speed data transmission. Among multiple serving cells that serve a same user equipment, one is called a primary cell (Primary Cell, PCell), and the other cells are called secondary cells (Secondary Cell, SCell).

In a communications system, in order to ensure that uplink data sent by a UE under a base station can arrive at the base station in a synchronized manner, in an uplink transmission process, the UE needs to maintain a timing advance (Timing Advance, TA), and the base station may adjust the timing advance for the UE according to an offset situation of an uplink signal. After the carrier aggregation technology is introduced, due to factors such as a location where a UE is or a technology adopted by a base station, timing advances of serving cells of a same UE may be different. In order to ensure that uplink data sent by a UE controlled by a base station can arrive at the base station in a synchronized manner, serving cells of the UE may be grouped according to whether timing advances are the same, and the timing advances of serving cells under a same timing advance group are the same, that is, the timing advance is of a group level.

SUMMARY

Embodiments of the present invention provide a method and device for determining a timing advance group of a serving cell. A source base station of a user equipment sends auxiliary information for determining a timing advance group of a target serving cell of the user equipment to a target base station to which a handover is to be performed. The target base station determines the timing advance group of the target serving cell according to the auxiliary information of the timing advance group, and sends the timing advance group to the UE. Therefore, the UE can obtain the timing advance group of the target serving cell rapidly, and timing advance grouping performed on a secondary carrier after handover is avoided, so as to reduce data transmission interruption or delay incurred by the handover, thereby improving quality of service of a communications service.

According to a first aspect of an embodiment of the present invention, the embodiment of the present invention provides a method for determining a timing advance group of a serving cell, including:
  determining, by a source base station of a user equipment, a target base station that the user equipment is to be handed over to;
  sending, by the source base station, auxiliary information for determining a timing advance group of a target serving cell of the user equipment to the target base station;
  receiving, by the source base station, the timing advance group of the target serving cell of the user equipment that is determined by the target base station according to the auxiliary information; and
  sending, by the source base station, the timing advance group of the target serving cell of the user equipment to the user equipment.

According to a second aspect of an embodiment of the present invention, the embodiment of the present invention provides a method for determining a timing advance group of a serving cell, including:
  receiving, by a target base station of a user equipment, auxiliary information that is sent by a source base station of the user equipment and is for determining a timing advance group of a target serving cell of the user equipment;
  determining, by the target base station, the timing advance group of the target serving cell of the user equipment according to the auxiliary information; and
  sending, by the target base station, the determined timing advance group of the target serving cell of the user equipment to the user equipment through the source base station.

According to a third aspect of an embodiment of the present invention, the embodiment of the present invention provides a method for obtaining a timing advance of a serving cell, including:
  receiving, by a user equipment, a timing advance group of a target serving cell of the user equipment sent by a source base station of the user equipment; and
  initiating, by the user equipment, a random access procedure according to the timing advance group of the target serving cell, so as to obtain a timing advance of the timing advance group of the target serving cell.

According to a fourth aspect of an embodiment of the present invention, the embodiment of the present invention provides a base station, including:
  a handover unit, configured to determine a target base station that a user equipment is to be handed over to;
  a sending unit, configured to send auxiliary information for determining a timing advance group of a target serving cell of the user equipment to the target base station; and
  a receiving unit, configured to receive the timing advance group of the target serving cell of the user equipment that is determined by the target base station according to the auxiliary information; where
  the sending unit is further configured to send the timing advance group of the target serving cell of the user equipment to the user equipment.

According to a fifth aspect of an embodiment of the present invention, the embodiment of the present invention provides a base station, including:

a receiving unit, configured to receive auxiliary information that is sent by a source base station of a user equipment and is for determining a timing advance group of a target serving cell of the user equipment;

a determining unit, configured to determine the timing advance group of the target serving cell of the user equipment according to the auxiliary information; and a sending unit, configured to send the determined timing advance group of the target serving cell of the user equipment to the user equipment through the source base station.

According to a sixth aspect of an embodiment of the present invention, the embodiment of the present invention provides a user equipment, including:

a receiving unit, configured to receive a timing advance group of a target serving cell of a user equipment sent by a source base station of the user equipment; and an accessing unit, configured to initiate a random access procedure according to the timing advance group of the target serving cell, so as to obtain a timing advance of the timing advance group of the target serving cell.

Implementation of the embodiments of the present invention has the following beneficial effects: In a handover process, a source base station of a user equipment sends auxiliary information for determining a timing advance group of a target serving cell to a target base station to which a handover is to be performed, so that the target base station determines the timing advance group of the target serving cell according to the auxiliary information of the timing advance group, and sends the determined timing advance group of the serving cell to the user equipment through the source base station, so as to avoid timing advance grouping performed on a secondary carrier after handover, and reduce data transmission interruption or delay incurred by the handover, thereby improving quality of service of a communications service.

BRIEF DESCRIPTION OF DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
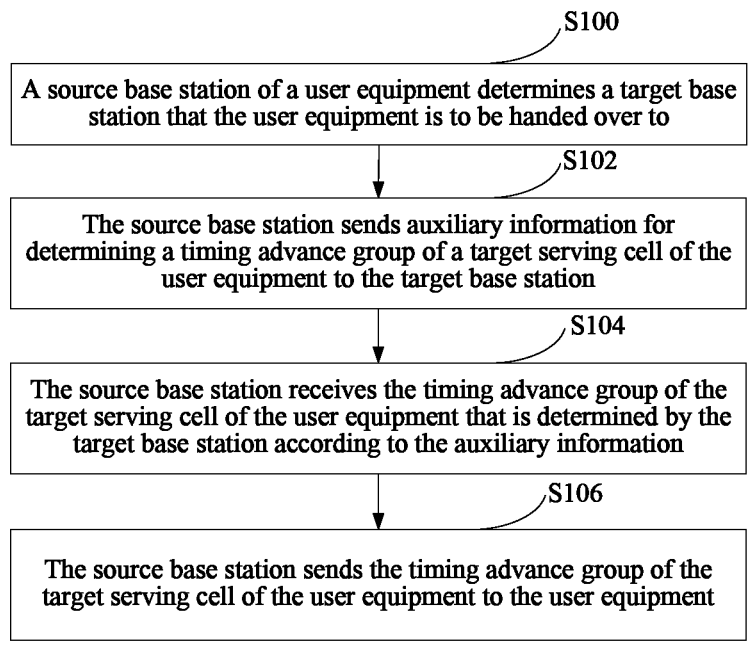
FIG. 1 is a first schematic diagram of a method for determining a timing advance group of a serving cell according to an embodiment of the present invention.

Referring to FIG. 1, FIG. 1 is a first schematic diagram of a method for determining a timing advance group of a serving cell according to an embodiment of the present invention, and the method includes:

S100: A source base station of a user equipment determines a target base station that the user equipment is to be handed over to.

S102: The source base station sends auxiliary information for determining a timing advance group of a target serving cell of the user equipment to the target base station.

S104: The source base station receives the timing advance group of the target serving cell of the user equipment that is determined by the target base station according to the auxiliary information.

S106: The source base station sends the timing advance group of the target serving cell of the user equipment to the user equipment.

In the embodiment of the present invention, after receiving a measurement report of the user equipment UE, the source base station (Source eNB) of the user equipment UE determines whether to perform handover, and after handover is determined, determines, for the user equipment, the target base station (Target eNB) to which a handover is to be performed, and sends the auxiliary information for determining the timing advance group of the target serving cell of the user equipment to the determined target base station. The auxiliary information may be sent to the target base station through a handover request (Handover Request) message. It should be noted that persons skilled in the art may also select any other suitable message form according to application requirements to send the auxiliary information for determining the timing advance group of the target serving cell of the UE.

In the embodiment of the present invention, the auxiliary information for determining the timing advance group of the target serving cell of the UE includes, but not limited to, a timing advance group identifier of a candidate target cell or a downlink-time difference of arrival of a candidate target cell. The timing advance group identifier may be a timing advance group id or a timing advance group index. In some other embodiments of the present invention, the auxiliary information for determining the timing advance group of the target serving cell of the UE may also be other information that helps group the timing advances. It should be noted that the handover request message in this embodiment further includes a candidate target cell list (Candidate Cell list) in addition to including the auxiliary information for determining the timing advance group of the target serving cell of the UE.

In the embodiment of the present invention, the source base station of the UE receives the timing advance group of the target serving cell of the UE that is determined by the target base station of the UE according to the auxiliary information. The received timing advance group may be put in a Handover Request ACK message between base stations and sent. The source base station may extract timing advance group information of the target serving cell of the UE from the received Handover Request ACK message, and send the extracted timing advance group information of the target serving cell to the user equipment through an air interface. Timing advances of target serving cells under a same timing advance group are the same. In a configuration process of a new target serving cell, a timing advance group to which the target serving cell belongs is configured for the UE by a base station. A timing advance group, where a primary cell (PCell) is, is always 0. The timing advance group of the target serving cell of the user equipment may be used by the user equipment to initiate a random access procedure, so as to obtain a timing advance of the timing advance group to which the target serving cell belongs.

In the embodiment of the present invention, the source base station of the user equipment may further send indication information to the user equipment. The indication information may be used to indicate a cell in which the user equipment initiates the random access procedure. Specifically, the indication information may include, but not limited to, an identifier of the cell in which the user equipment initiates the random access procedure, or a random access resource of the cell in which the user equipment initiates the random access procedure. For example, the identifier of the cell in which the random access procedure is initiated may be 1 bit (bit) newly added for the cell; when the newly added bit of the cell is 1, it may be indicated that the random access procedure is initiated in the cell, or when the newly added bit of the cell is 0, it may be indicated that the random access procedure is initiated in the cell. For example, the random access resource of the cell in which the random access procedure is initiated may be cell common random access configuration resources of one or more cells and/or dedicated random access resources of one or more cells.

Figure 2:
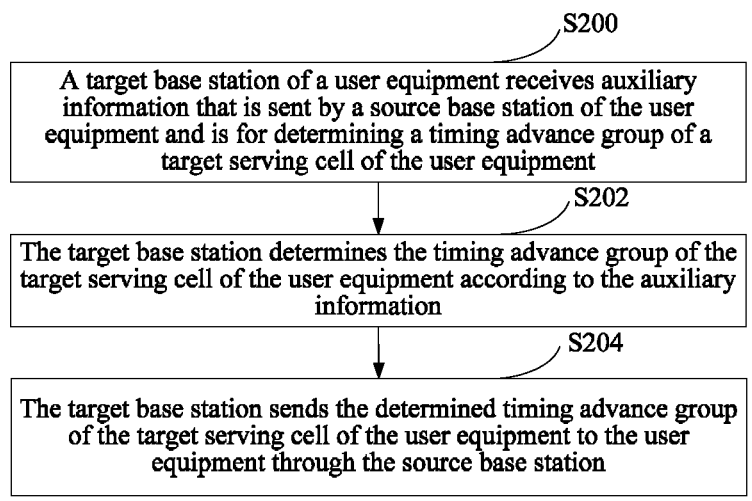
FIG. 2 is a second schematic diagram of a method for determining a timing advance group of a serving cell according to an embodiment of the present invention.

Referring to FIG. 2, FIG. 2 is a second schematic diagram of a method for determining a timing advance group of a serving cell according to an embodiment of the present invention, and the method includes:

S200: A target base station of a user equipment receives auxiliary information that is sent by a source base station of the user equipment and is for determining a timing advance group of a target serving cell of the user equipment.

S202: The target base station determines the timing advance group of the target serving cell of the user equipment according to the auxiliary information.

S204: The target base station sends the determined timing advance group of the target serving cell of the user equipment to the user equipment through the source base station. In a handover process of the embodiment of the present invention, the target base station of the user equipment receives the auxiliary information, sent by the source base station of the user equipment, for determining the timing advance group of the target serving cell of the user equipment. The auxiliary information includes, but not limited to, a timing advance group identifier of a candidate target cell, or a downlink-time difference of arrival of a candidate target cell. The target base station determines the timing advance group of the target serving cell according to the auxiliary information. Specifically, the target base station may take advice from the source base station to use the timing advance group identifier of the candidate target serving cell as the timing advance group identifier of the target serving cell (if the candidate target serving cell is determined as the target serving cell by the target base station), may also estimate a corresponding uplink time difference according to the downlink-time difference of arrival of the candidate target serving cell to determine the timing advance group of the target serving cell, and may also determine the timing advance group of the target serving cell according to network deployment information such as whether the target serving cell is remote radio heads (Remote Radio Heads, RRH) or whether the target serving cell passes through a repeater (Repeater). The timing advance group of the target serving cell of the user equipment may be used by the user equipment to initiate a random access procedure, so as to obtain a timing advance of the timing advance group to which the target serving cell of the user equipment belongs.

After determining the timing advance group of the target serving cell, the target base station may package the determined timing advance group information of the target serving cell of the UE into a handover command message (for example, an RRC connection reconfiguration message carrying an information element of mobility control information, MobilityControlInfo), and send the handover command message to the source base station by putting the handover command message in a Handover Request ACK message between base stations, so that the source base station extracts the command message, and sends the command message to the user equipment UE through an air interface. The handover command message packaged by the target base station further includes a target serving cell list (SCell list) in addition to including the timing advance group information of the target serving cell. It should be noted that persons skilled in the art may select another suitable message form according to is to send the timing advance group information of the target serving cell of the UE, which is not limited to the handover command message mentioned in this embodiment.

Figure 3:
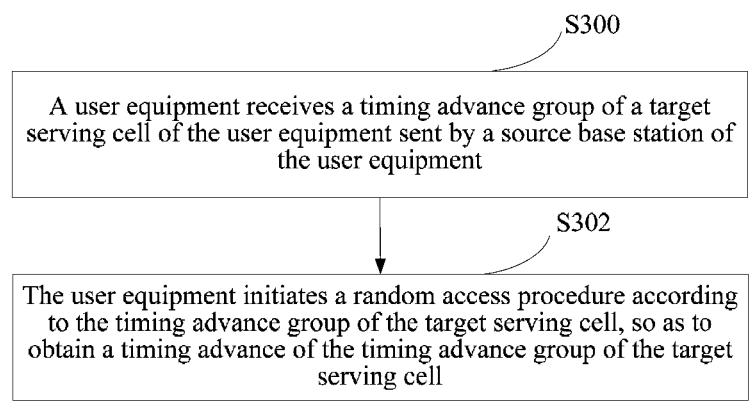
FIG. 3 is a schematic diagram of a method for obtaining a timing advance of a serving cell according to an embodiment of the present invention.

Referring to FIG. 3, FIG. 3 is a schematic diagram of a method for obtaining a timing advance of a serving cell according to an embodiment of the present invention, and the method includes:

S300: A user equipment receives a timing advance group of a target serving cell of the user equipment sent by a source base station of the user equipment.

S302: The user equipment initiates a random access procedure according to the timing advance group of the target serving cell, so as to obtain a timing advance of the timing advance group of the target serving cell.

In the embodiment of the present invention, the user equipment UE receives the timing advance group of the target serving cell of the user equipment sent by the source base station of the user equipment. For example, the timing advance group of the target serving cell may be sent through an RRC connection reconfiguration message carrying an information element of mobility control information, MobilityControlInfo, and definitely, may also be sent through any other suitable message suitable for sending timing advance group information of the target serving cell. The RRC connection reconfiguration message may further include a secondary cell list (SCell list).

In the embodiment of the present invention, the user equipment may further receive indication information. The indication information is used to indicate a cell in which the user equipment initiates the random access procedure. The indication information includes, but not limited to, an identifier of the cell in which the user equipment initiates the random access procedure, or a random access resource of the cell in which the user equipment initiates the random access procedure. For example, the identifier of the cell in which the random access procedure is initiated may be 1 bit (bit) newly added for the cell; when the newly added bit of the cell is 1, it may be indicated that the random access procedure is initiated in the cell, or when the newly added bit of the cell is 0, it may be indicated that the random access procedure is initiated in the cell. For example, the random access resource of the cell in which the random access procedure is initiated may be a cell common random access configuration resource of one or more cells and/or dedicated random access resource of one or more cells. The user equipment UE may initiate the random access procedure according to the timing advance group of the target serving cell, the cell common random access configuration resource of one or more cells, or the cell common random access configuration resource and dedicated random access resources of one or more cells, so as to obtain the timing advance of the timing advance group of the target serving cell. Specifically, the user equipment UE may randomly select a target serving cell from each timing advance group to initiate the random access procedure. In other words, the UE selects the cell in which the random access procedure is initiated, and for each timing advance group, it is only required to initiate the random access procedure in one cell in the timing advance group to obtain timing advances for all cells in the timing advance group. Preferably, the UE initiates dedicated random access to one or more cells according to the cell common random access configuration resource and the dedicated random access resources of the one or more cells, so as to obtain a corresponding timing advance of the timing advance group to which the one or more cells belong. The random access procedure is initiated by adopting the dedicated random access resources, so as to avoid a possible conflict incurred by random access initiated by adopting non-dedicated random access resources, thereby increasing a success rate of the random access procedure and decreasing an access delay.

In some embodiments of the present invention, if the dedicated random access resources are not received, the user equipment UE initiates a non-dedicated random access procedure according to the cell common random access configuration resource of one or more cells in the command message, for example, an information element named rach-ConfigCommon used for random access (including transmit power, the number of non-dedicated random access preamble resources, and so on) and an information element named prach-Config used for physical random access channel configuration (including a frequency domain position where a channel is located and so on), so as to obtain a timing advance of a target serving cell of the corresponding timing advance group of the target serving cell.

Figure 4:
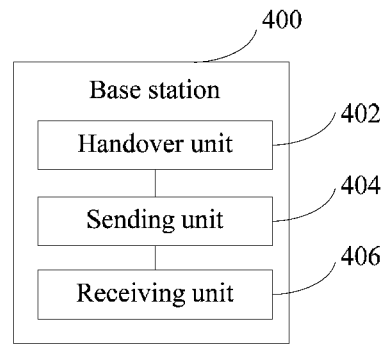
FIG. 4 is a first schematic structural diagram of a base station according to an embodiment of the present invention.

Referring to FIG. 4, FIG. 4 is a first schematic structural diagram of a base station according to an embodiment of the present invention, and the base station 400 includes:

a handover unit 402, configured to determine a target base station that a user equipment is to be handed over to;

a sending unit 404, configured to send auxiliary information for determining a timing advance group of a target serving cell of the user equipment to the target base station; and a receiving unit 406, configured to receive the timing advance group of the target serving cell of the user equipment that is determined by the target base station according to the auxiliary information.

The sending unit 404 is further configured to send the timing advance group of the target serving cell of the user equipment to the user equipment. The base station in the embodiment of the present invention may act as a source base station of the user equipment in a handover process. The handover unit determines the target base station that the user equipment UE is to be handed over to. The sending unit sends the auxiliary information for determining the timing advance group of the target serving cell of the user equipment to the target base station determined by the handover unit. The sent auxiliary information includes, but not limited to, a timing advance group identifier of a candidate target cell, or a downlink-time difference of arrival of a candidate target cell. The timing advance group identifier may be a timing advance group id or a timing advance group index. In some other embodiments of the present invention, the auxiliary information used for grouping timing advances may also be other information that helps group the timing advances. The auxiliary information may be sent to the target base station through a handover request (Handover Request) message. It should be noted that persons skilled in the art may also select any other suitable message form according to application requirements to send the auxiliary information for determining the timing advance group of the target serving cell of the UE. The handover request message further includes a candidate target cell list (Candidate Cell list) in addition to including the auxiliary information for determining the timing advance group of the target serving cell of the user equipment. In the embodiment of the present invention, the handover unit may be implemented through a data processing device of a base station, and the sending unit may be implemented through a transmitting device of a base station.

In the embodiment of the present invention, the base station may further include a receiving unit that receives the timing advance group of the target serving cell of the user equipment that is determined by the target base station according to the auxiliary information, and the sending unit sends, to the user equipment, the timing advance group information of the target serving cell of the UE received by the receiving unit. In the embodiment of the present invention, the receiving unit may be implemented through a receiving device of a base station, and the sending unit may be implemented through a transmitting device of a base station.

The sending unit in the embodiment of the present invention may further send indication information to the user equipment. The indication information may be used to indicate a cell in which the user equipment initiates a random access procedure. Specifically, the indication information may include, but not limited to, an identifier of the cell in which the user equipment initiates the random access procedure, or a random access resource of the cell in which the user equipment initiates the random access procedure. For example, the identifier of the cell in which the random access procedure is initiated may be 1 bit (bit) newly added for the cell; when the newly added bit of the cell is 1, it may be indicated that the random access procedure is initiated in the cell, or when the newly added bit of the cell is 0, it may be indicated that the random access procedure is initiated in the cell. For example, the random access resource of the cell in which the random access procedure is initiated may be a cell common random access configuration resource of one or more cells and/or dedicated random access resources of one or more cells.

Figure 5:
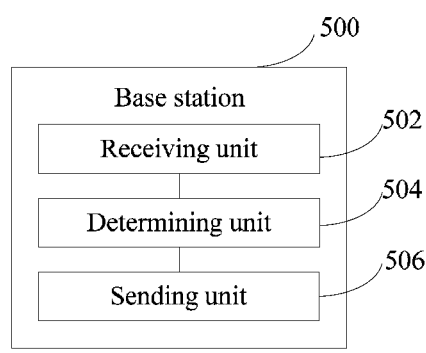
FIG. 5 is a second schematic structural diagram of a base station according to an embodiment of the present invention.

Referring to FIG. 5, FIG. 5 is a second schematic structural diagram of a base station according to an embodiment of the present invention, and the base station 500 may include:

a receiving unit 502, configured to receive auxiliary information that is sent by a source base station of a user equipment and is for determining a timing advance group of a target serving cell of the user equipment;

a determining unit 504, configured to determine the timing advance group of the target serving cell of the user equipment according to the auxiliary information; and a sending unit 506, configured to send the determined timing advance group of the target serving cell of the user equipment to the user equipment through the source base station.

In the embodiment of the present invention, the base station may act as a target base station of the user equipment in a handover process, and the receiving unit receives the auxiliary information, sent by the source base station of the user equipment, for determining the timing advance group of the target serving cell of the user equipment. The auxiliary information includes, but not limited to, a timing advance group identifier of a candidate target cell, or a downlink-time difference of arrival of a candidate target cell. The auxiliary information may be sent through a handover request message. It should be noted that, persons skilled in the art may send the auxiliary information through other suitable message forms. The handover request message in this embodiment further includes a candidate target cell list (Candidate Cell list) in addition to including the auxiliary information for determining the timing advance group of the target serving cell of the UE. The receiving unit in the embodiment of the present invention may be implemented through a receiving device of a base station.

The determining unit determines the timing advance group of the target serving cell of the user equipment according to the auxiliary information, and specifically may take advice from the source base station of the user equipment to use the timing advance group identifier of the candidate target serving cell as the timing advance group identifier of the target serving cell (if the candidate target serving cell is determined as the target serving cell by the target base station), may also estimate a corresponding uplink time difference according to the downlink-time difference of arrival of the candidate target serving cell to determine the timing advance group of the target cell, and may also determine the timing advance group of the target serving cell according to network deployment information such as whether the target cell is remote radio heads (Remote Radio Heads, RRH) or whether the target cell passes through a repeater (Repeater). The timing advance group of the target serving cell of the user equipment may be used by the user equipment to initiate a random access procedure, so as to obtain a timing advance of the timing advance group to which the target serving cell of the user equipment belongs. The determining unit in the embodiment of the present invention may be implemented through a device of a data processing part of a base station.

After the determining unit determines the timing advance group of the target serving cell of the UE, the sending unit may package determined timing advance group information of the target serving cell of the user equipment in a command message (which may be, for example, an RRC connection reconfiguration message carrying an information element of mobility control information, MobilityControlInfo, or any other suitable message suitable for sending the timing advance group information of the target serving cell of the UE), and send the command message to the source base station by putting the command message in a Handover Request ACK message between base stations, so that the source base station extracts the command message, and sends the command message to the user equipment UE through an air interface. The sending unit in the embodiment of the present invention may be implemented through a sending device of a base station.

Figure 6:
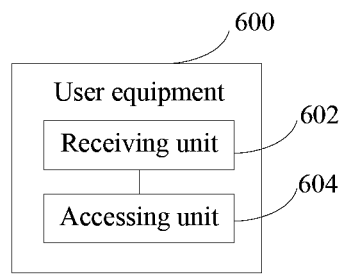
FIG. 6 is a schematic structural diagram of a user equipment according to an embodiment of the present invention.

Referring to FIG. 6, FIG. 6 is a schematic structural diagram of a user equipment according to an embodiment of the present invention, and the user equipment 600 may include:
- a receiving unit 602, configured to receive a timing advance group of a target serving cell of a user equipment sent by a source base station of the user equipment; and
- an accessing unit 604, configured to initiate a random access procedure according to the timing advance group of the target serving cell, so as to obtain a timing advance of the timing advance group of the target serving cell.

The user equipment UE in the embodiment of the present invention includes the receiving unit and the accessing unit. The receiving unit receives the timing advance group of the target serving cell of the user equipment sent by the source base station of the user equipment. For example, the timing advance group of the target serving cell may be sent through an RRC connection reconfiguration message carrying an information element of mobility control information, MobilityControlInfo, and definitely, may also be sent through any other suitable message suitable for sending timing advance group information of the target serving cell. The RRC connection reconfiguration message may further include a secondary cell list (SCell list).

In the embodiment of the present invention, the receiving unit may further receive indication information. The indication information is used to indicate a cell in which the user equipment initiates the random access procedure. The indication information includes, but not limited to, an identifier of the cell in which the user equipment initiates the random access procedure, or a random access resource of the cell in which the user equipment initiates the random access procedure. For example, the identifier of the cell in which the random access procedure is initiated may be 1 bit (bit) newly added for the cell; when the newly added bit of the cell is 1, it may be indicated that the random access procedure is initiated in the cell, or when the newly added bit of the cell is 0, it may be indicated that the random access procedure is initiated in the cell. For example, the random access resource of the cell in which the random access procedure is initiated may be a cell common random access configuration resource of one or more cells and/or dedicated random access resources of one or more cells. The accessing unit may initiate random access according to a timing advance group in a command message, or cell common random access configuration information and dedicated random access resources of one or more cells, or cell common random access configuration information of one or more cells, so as to obtain a timing advance of the timing advance group of the target serving cell. Specifically, the accessing unit may randomly select a target cell from each timing advance group to initiate the random access procedure. In other words, the accessing unit of the UE selects the cell in which the random access procedure is initiated, and for each timing advance group, it is only required to initiate the random access procedure in one cell in the timing advance group to obtain timing advances for all cells in the timing advance group. Preferably, the accessing unit initiates dedicated random access to one or more cells according to the cell common random access configuration information and the dedicated random access resources of the one or more cells received by the receiving unit, so as to obtain a corresponding timing advance of the timing advance group to which the one or more cells belong. The random access procedure is initiated by adopting the dedicated random access resources, so as to avoid a possible conflict incurred by random access initiated by adopting non-dedicated random access resources, thereby increasing a success rate of the random access procedure and decreasing an access delay.

In some embodiments of the present invention, if the receiving unit does not receive the dedicated random access resources, the accessing unit may initiate a non-dedicated random access procedure according to the cell common random access configuration information of one or more cells, for example, an information element named rach-ConfigCommon used for random access (including transmit power, the number of non-dedicated random access preamble resources, and so on) and an information element named prach-Config used for physical random access channel configuration (including a frequency domain position where a channel is located and so on), so as to obtain a timing advance of a corresponding timing advance group.

Persons of ordinary skill in the art should understand that, all or a part of processes in the method according to the embodiments may be accomplished by relevant hardware under instructions of a computer program. The program may be stored in a computer-readable storage medium. When the program is executed, the process of the method according to the embodiments of the present invention is performed. The storage medium may be a magnetic disk, an optical disk, a read-only memory (Read-Only Memory, ROM), a random access memory (Random Access Memory, RAM), and the like.

The above descriptions are merely an exemplary embodiment of the present invention, and the scope of the present invention is not limited thereto. Equivalent modifications made according to the claims of the present invention should fall within the scope of the present invention.

What is claimed is:

1. A source base station, comprising:
    a processor, configured to determine a target base station that a user equipment is to be handed over to;
    a transmitter, configured to send auxiliary information for determining a timing advance group of a target serving cell of the user equipment to the target base station, wherein the auxiliary information comprises a timing advance group identifier of a candidate target cell; and
    a receiver, configured to receive the timing advance group of the target serving cell of the user equipment that is determined by the target base station according to the auxiliary information;
    wherein the transmitter is further configured to send the timing advance group of the target serving cell of the user equipment to the user equipment,
    wherein the timing advance group of the target serving cell is used by the user equipment to initiate a random access procedure, so as to obtain a timing advance of the timing advance group of the target serving cell,
    wherein the transmitter is further configured to send indication information to the user equipment, which is used to indicate a cell in which the user equipment initiates the random access procedure, and
    wherein the indication information comprises:
        an identifier of the cell in which the user equipment initiates the random access procedure, or a random access resource of the cell in which the user equipment initiates the random access procedure.

2. The base station according to claim 1, wherein the auxiliary information further comprises a downlink-time difference of arrival of a candidate target cell.

3. The base station according to claim 1, wherein the receiver receives the timing advance group of the target serving cell from a Handover Request ACK message from the target base station.

4. The base station according to claim 1, wherein the transmitter is further configured to send a candidate target cell list in a message also including the auxiliary information.

5. A user equipment, comprising:
    a receiver, configured to receive a timing advance group of a target serving cell of a user equipment sent by a source base station of the user equipment, wherein the timing advance group of the target serving cell is determined based on auxiliary information provided to the target serving cell from the source base station, and the auxiliary information comprises a timing advance group identifier of a candidate target cell; and
    a processor, configured to initiate a random access procedure according to the timing advance group of the target serving cell, wherein the random access procedure is used for obtaining a timing advance of the timing advance group of the target serving cell,
    wherein the receiver is further configured to receive indication information from the source base station, which is used to indicate a cell in which the user equipment initiates the random access procedure, and
    wherein the indication information comprises:
        an identifier of the cell in which the user equipment initiates the random access procedure, or a random access resource of the cell in which the user equipment initiates the random access procedure.

6. A method for obtaining a timing advance, the method comprising:
    receiving, by a user equipment, a timing advance group of a target serving cell of the user equipment sent by a source base station of the user equipment, wherein the timing advance group of the target serving cell is determined based on auxiliary information provided to the target serving cell from the source base station, and the auxiliary information comprises a timing advance group identifier of a candidate target cell;
    receiving indication information from the source base station, which is used to indicate a cell in which the user equipment initiates a random access procedure; and
    initiating, by the user equipment, the random access procedure according to the timing advance group of the target serving cell, wherein the random access procedure is used for obtaining a timing advance of the timing advance group of the target serving cell,
    wherein the indication information comprises:
        an identifier of the cell in which the user equipment initiates the random access procedure, or a random access resource of the cell in which the user equipment initiates the random access procedure.

7. The method according to claim 6, wherein the auxiliary information further comprises a downlink-time difference of arrival of a candidate target cell.

* * * * *